US009121718B2

(12) United States Patent
Uyeki et al.

(10) Patent No.: US 9,121,718 B2
(45) Date of Patent: Sep. 1, 2015

(54) METHOD AND SYSTEM FOR IMPROVED VEHICLE NAVIGATION

(75) Inventors: Robert Uyeki, Torrance, CA (US); Kan Shishido, Rancho Palos Verdes, CA (US)

(73) Assignee: Honda Motor Co., Ltd., Minato-ku, Tokyo (JP)

(*) Notice: Subject to any disclaimer, the term of this patent is extended or adjusted under 35 U.S.C. 154(b) by 522 days.

(21) Appl. No.: 13/301,038

(22) Filed: Nov. 21, 2011

(65) Prior Publication Data

US 2013/0131974 A1    May 23, 2013

(51) Int. Cl.
*G01C 21/32* (2006.01)
*G01C 21/34* (2006.01)
*B60L 11/18* (2006.01)
*B60L 15/20* (2006.01)

(52) U.S. Cl.
CPC ............. *G01C 21/32* (2013.01); *B60L 11/1846* (2013.01); *B60L 15/2045* (2013.01); *G01C 21/3469* (2013.01); *B60L 2240/622* (2013.01); *Y02T 10/7005* (2013.01); *Y02T 10/7283* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/169* (2013.01); *Y04S 30/14* (2013.01)

(58) Field of Classification Search
CPC .... G01C 21/26; G01C 21/3446; G01C 21/36; G01C 21/32; G08G 1/096827; B60L 11/1846; B60L 15/2045; B60L 2240/622; Y02T 90/14; Y02T 90/16; Y02T 90/121; Y02T 90/128; Y02T 90/161; Y02T 90/163; Y02T 90/169; Y02T 10/7005; Y02T 10/7291; Y04S 30/14
USPC .......................................................... 701/410
See application file for complete search history.

(56) References Cited

U.S. PATENT DOCUMENTS

| | | | | |
|---|---|---|---|---|
| 8,294,420 | B2* | 10/2012 | Kocher | 320/109 |
| 8,301,365 | B2* | 10/2012 | Niwa et al. | 701/532 |
| 2009/0246596 | A1* | 10/2009 | Sridhar et al. | 429/34 |
| 2012/0330494 | A1* | 12/2012 | Hendrix et al. | 701/29.3 |

FOREIGN PATENT DOCUMENTS

| | | | |
|---|---|---|---|
| WO | 2010150665 | A1 | 12/2010 |
| WO | 2011023427 | A2 | 3/2011 |
| WO | 2011098195 | A1 | 8/2011 |
| WO | 2012068089 | A1 | 5/2012 |

* cited by examiner

*Primary Examiner* — James Trammell
*Assistant Examiner* — James E Stroud
(74) *Attorney, Agent, or Firm* — Quarles & Brady LLP

(57) ABSTRACT

A system and method of revising data in a vehicular navigating system configured to navigate a vehicle to a target point of interest is presented. A geographical information database storing location information for a plurality of points of interest and a plurality of roadways is provided and a charging status of a vehicle is detected. When the charging status of the vehicle indicates that the vehicle is charging, a location of the vehicle is recorded. The location of the vehicle when the charging status of the vehicle indicates that the vehicle is charging is used to update a location of a charging station within the geographical information database.

15 Claims, 6 Drawing Sheets

METHOD AND SYSTEM FOR IMPROVED VEHICLE NAVIGATION

FIELD OF THE INVENTION

The disclosure relates in general to a system and method for vehicle navigation and, more particularly, to a system and method for vehicle navigation utilizing vehicle probe data.

BACKGROUND OF THE INVENTION

Many vehicles include navigation systems that assist a driver in navigating to a particular destination. Generally, the systems include a database that stores information describing a number of points of interest (POIs) and roadways. After the driver identifies a particular target POI, the navigation system calculates a route along available roadways that will allow the vehicle to travel from its current location to the selected POI.

The navigation system is only as accurate as its database. As such, the database must be updated from time to time or else the data becomes stale. Old databases may include POIs that no longer exist, or roadways that have been closed, and may also fail to include newer POIs and new roads. As POIs change, the accuracy of any particular navigation system can be quickly diminished.

Additionally, because navigation systems use addresses to store the location of POIs, the location of a particular POI is only as accurate as that POI's address. For POIs located on small properties (e.g., homes, independent restaurants, or stand-alone stores) an address can usually accurately locate that POI. For other POIs that are part of larger properties, though, addresses can be very inaccurate, particularly when the POI sublets from a larger property. For restaurants or gas stations located at a shopping mall, for example, the only address available may be that of the shopping mall. In that case, the address of the shopping mall may identify a point that is some distance away from the POI itself.

FIG. 1, for example, shows an overhead view of a shopping mall. In FIG. 1, the location identified by the address for the entire shopping complex is shown as element 2. The address for the shopping mall is generally positioned at a corner of the property proximate the intersection of two cross-streets. Also as shown on FIG. 1, the location of the POI on the mall property is shown by bull's eye 4. If a user should attempt to navigate to the POI (e.g., a particular store, gas station, or other establishment on the mall property) using the address for the shopping mall, as demonstrated by FIG. 1, the navigation system will navigate the user to a location that is some distance from the POI.

One particular type of POI that can be particularly difficult to locate accurately is electric vehicle (EV) charging stations. As EV charging stations become increasingly popular, new or upgraded charging stations will be rapidly deployed, and old stations will be removed or disabled. Often, charging stations are located within larger properties, such as large parking lots of shopping malls, airports, or convention centers, making accurately locating the charge stations difficult.

SUMMARY OF THE INVENTION

The disclosure relates in general to a system and method for vehicle navigation and, more particularly, to a system and method for vehicle navigation utilizing vehicle probe data.

In one implementation, the present invention is a method of revising data in a vehicular navigating system configured to navigate a vehicle to a target point of interest. The method includes providing a geographical information database storing location information for a plurality of points of interest and a plurality of roadways, and detecting a charging status of a vehicle. When the charging status of the vehicle indicates that the vehicle is charging, the method includes recording a location of the vehicle. The method includes using the location of the vehicle when the charging status of the vehicle indicates that the vehicle is charging to update a location of a charging station within the geographical information database.

In another implementation, the present invention is a navigation system. The navigation system includes a geographical information database configured to store location information for a plurality of points of interest and a plurality of roadways, and a vehicle sensor configured to detect a charging status of a vehicle. The navigation system includes a processor in communication with the geographical information database and the vehicle sensor. The processor is configured to, when the charging status of the vehicle indicates that the vehicle is charging, record a location of the vehicle, and use the location of the vehicle when the charging status of the vehicle indicates that the vehicle is charging to update a location of a charging station within the geographical information database.

In another implementation, the present invention is a non-transitory computer program product usable with a processor having a computer readable program code embodied therein. The product includes computer readable program code which provides a geographical information database storing location information for a plurality of points of interest and a plurality of roadways, computer readable program code which detects a charging status of a vehicle, and computer readable program code which, when the charging status of the vehicle indicates that the vehicle is charging, records a location of the vehicle. The product includes computer readable program code which uses the location of the vehicle when the charging status of the vehicle indicates that the vehicle is charging to update a location of a charging station within the geographical information database.

DETAILED DESCRIPTION OF THE DRAWINGS

Figure 1:
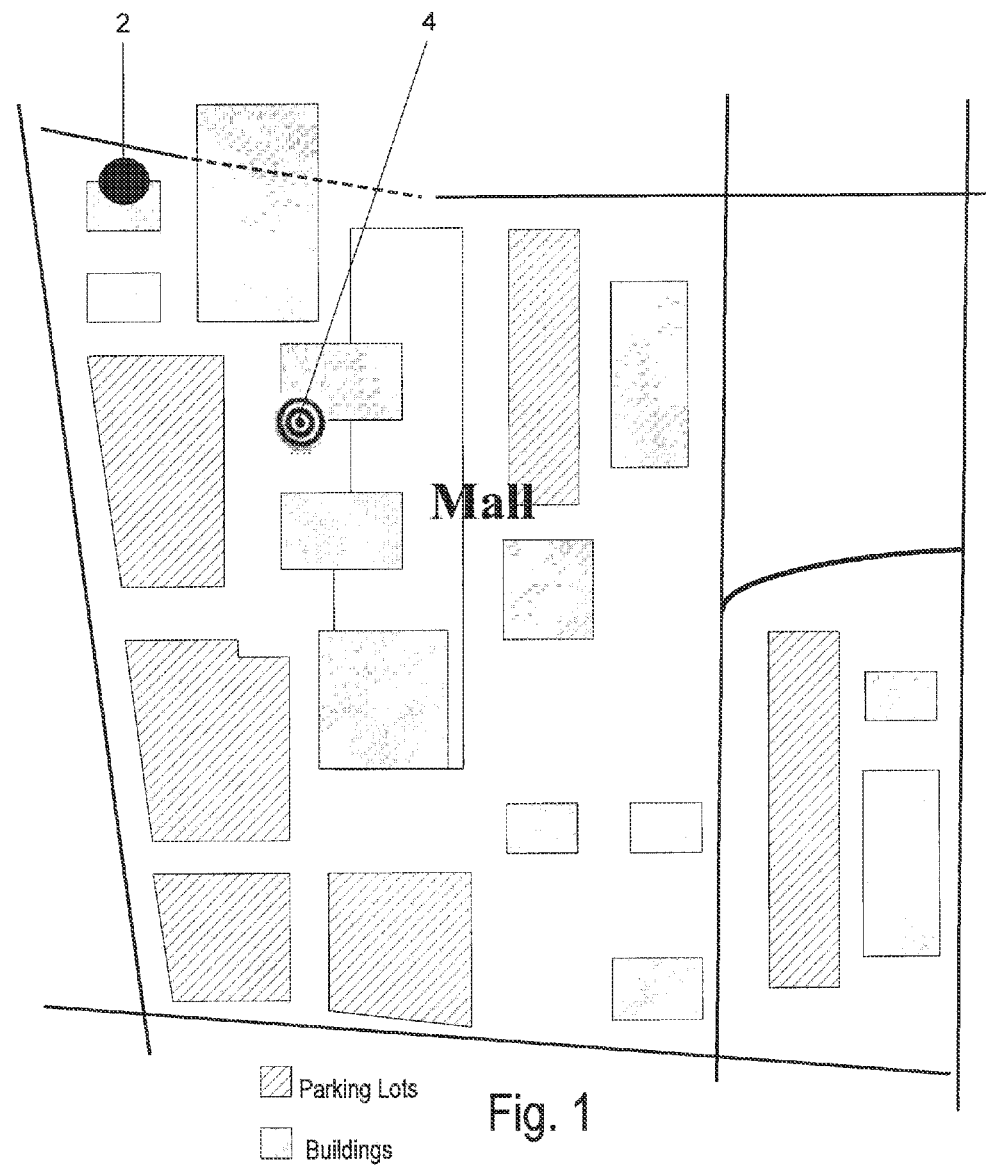
FIG. 1 is an overhead view of a shopping mall illustrating roadways through the property associated with the mall.

The disclosure relates in general to a system and method for vehicle navigation and, more particularly, to a system and method for vehicle navigation utilizing vehicle probe data.

The present system monitors the movement of a vehicle as it navigates to a particular POI. By analyzing the vehicle's location probe data, as well as a number of on-board sensors, the system can refine location and routing information associated with the POI. For example, if the POI is initially associated with a first location, but the vehicle actually navigates to a second location (indicating that the first location is inaccurate), the system may refine the stored location information associated with the POI. In one specific implementation, the present system is used to assist electric vehicles (EVs) in negotiating to EV charge stations. In that case, not only does the present system use vehicle data to refine the location associated with a particular EV charge station, but additional sensors can be used to gather specific information describing the EV charge station. That additional information can be incorporated into a database of the present navigation system to provide improved navigational capabilities.

In one implementation, for example, the navigation system uses vehicle location probe data to identify the most accurate route to, and location of, particular POIs, such as EV charge stations. For POIs that are located beneath structures (e.g., on the ground floor of a multi-floor parking structure), or in areas with poor GPS reception, additional vehicle sensors such as gyroscopes or accelerometers are used to supplement the vehicle GPS data.

When the navigation system assists in a user navigating an EV to an EV charge station, sensors within the EV are used to identify when the EV is charging, and, therefore, whether that particular EV is located at an operational and available charge station. Probe data captured from the vehicle can then be used to verify that the navigation system has stored correct location data for the charge station. If the probe data indicates that the vehicle is positioned some distance away from the charge station location stored within the navigation system, the probe data can be used to correct the location data for that charge station. In some cases, the vehicle's navigation system communicates with a central computer system, which aggregates position data received from a number of vehicles. Based upon that aggregated information, the location information associated with particular POIs can be refined using robust positional data collected from a number of sources.

In some implementations, manual inspection of satellite imagery or overhead imagery is used to further refine the location of particular POIs stored in the present system. Satellite or overhead imagery may also be used to create the maps used by the navigation system. When using satellite or overhead imagery to identify particular points of interest or geographical features or to create maps, though, the satellite or overhead imagery cannot generally be used for mapping or locating underground or obscured structures such as tunnels, lower levels in parking lots or buildings, or features that are otherwise obscured in the satellite's or overhead image's view. Additionally, when non-public roadways are used to navigate to a particular charge station, the present system can capture data describing those non-public roadways. Those roadways can then be used by the navigation system in calculating new routes.

Figure 2:
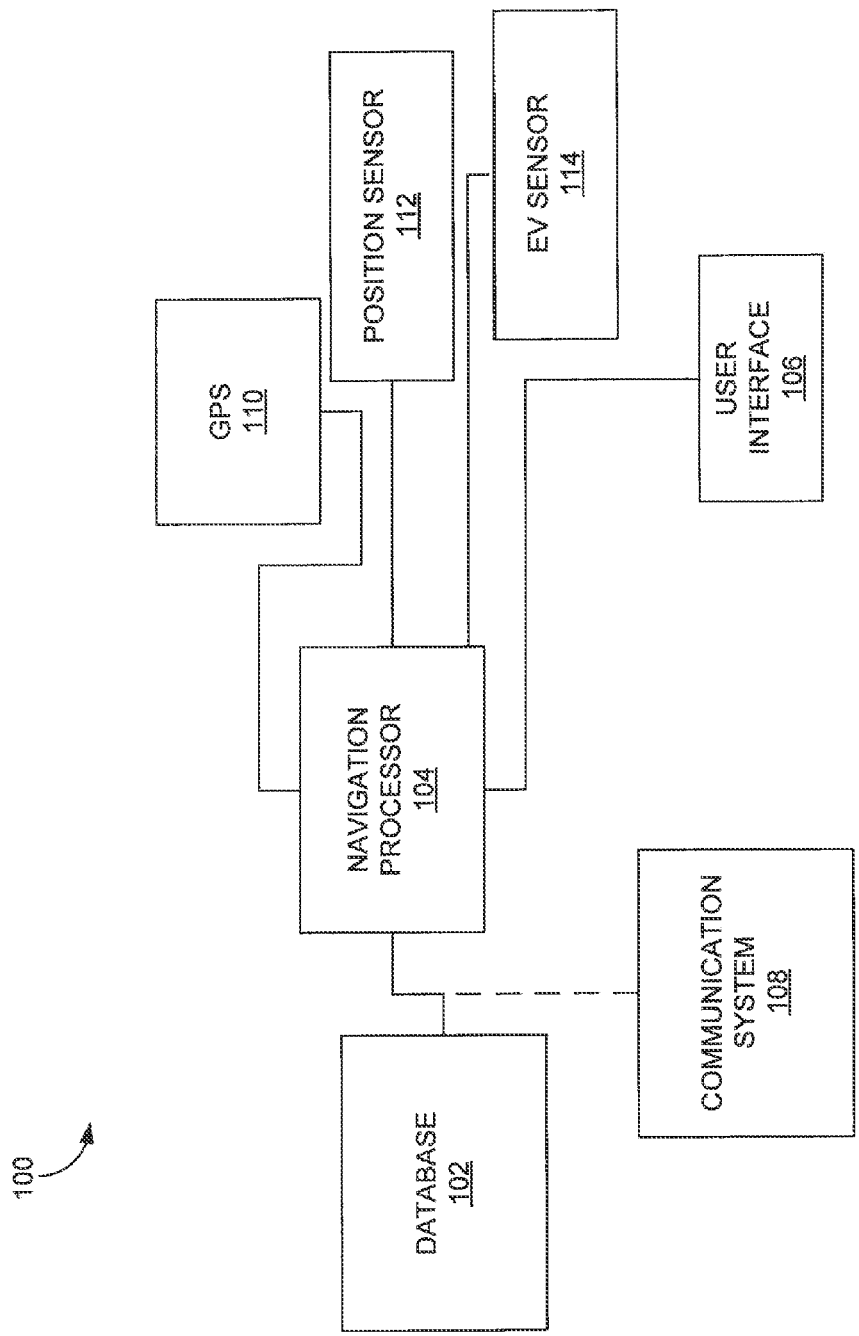
FIG. 2 is a block diagram illustrating functional components of an exemplary navigation system that is consistent with at least some aspects of the present disclosure.

FIG. 2 is a block diagram illustrating functional components of an exemplary navigation system 100. System 100 includes a navigation processor 104 which is connected to database 102 and communication system 108. Navigation processor 104 is also connected to GPS sensor 110, position sensor 112, EV sensor 114, and user interface 106.

System 100 allows a user to identify particular target POIs by searching through a list of POIs stored in an accessible database. After the user selects a particular target POI, system 100 calculates a route to the target POI and displays the route using an appropriate user interface. In implementations where system 100 is installed into the user's vehicle, system 100 monitors current location probe data of the vehicle as the user navigates the vehicle to the target POI. If the user should deviate from the route calculated by system 100, system 100 can update the route accordingly. The user interface also allows a user to identify POIs so that they may be retrieved easily for future use.

System 100 can also use the vehicle location probe captured while a vehicle navigates to a particular target POI to update the system's geographical information database. If, for example, the vehicle's actual path taken to a particular target POI represents a more efficient path than the path originally calculated by system 100, system 100 may update the database to store the data describing the more efficient route. The new data may indicate the presence of new roadways (e.g., private or newly constructed roadways) that can be used by system 100 to calculated routes in the future.

In some cases, system 100 monitors one or more sensors located within the user's vehicle to identify various attributes of a particular target POI in order to supplement the navigation system's geographical information database with additional data. For example, if, at a particular location, the user's vehicle undergoes a refueling operation or, in the case of an electrical vehicle, a recharging operation, system 100 may associate the location of the vehicle at that time with an available refueling or recharging station. As such, the navigation system can use vehicle location probe data to both correct and enhance the information stored by the navigation system.

Navigation processor 104 is configured to implement the functionality of navigation system 100. Processor 104 is configured to communicate with various components of system 100 for retrieving geographical information, receiving user input, and generating an appropriate output. Processor 104, for example, may retrieve geographical information from database 102 for calculating routes to selected POIs based upon a user input. Once calculated, the route can be displayed via user interface 106 for review by the user. The user can then monitor user interface 106 in order to navigate to the selected POI.

Database 102 stores information describing a number of POIs, roadways, and geographical regions or areas. For each roadway, database 102 stores data specifying the location or route of each roadway through the covered geographic region. Additionally, database 102 can store information describing attributes of the roadways, such as their speed limits, limitations on the direction of travel, congestion levels (either predicted or actual), names, and the like.

Database 102 is also configured to store information describing the POIs, such as their location and address. For non-private POIs, such as hotels, restaurants, museums, and stadiums, database 102 can store additional information describing services or products available at the POIs, preferred parking locations for the POI, hours of operation, and the like.

Database 102 can also store governmental information, such as the locations of cities, or towns, and their respective border locations. Database 102 may also store information describing the terrain within the covered geographical region. The terrain data may include elevation data, the path of rivers or streams through the region, and the location of forest or lakes.

Database 102 can store geographical information collected from a number of sources. For example, geographical information can be preloaded into database 102 at the time of manufacture of system 100. The information can then be updated by a series of upgrades or updates that are distributed to users via media such as compact discs (CDs) or digital versatile discs (DVDs). Alternatively, the geographical information can be distributed to system 100 via a wireless communications network, such as through cellular phone networks or via radio distribution.

Additionally, the contents of database 102 may be supplemented, modified, or updated by system 100 based upon vehicle probe data, including observed movement or navigation of the vehicle. The vehicle probe data can be collected via GPS sensor 110 and position sensor 112, as described below. If, for example, the vehicle probe data indicates that the vehicle deviated from a calculated path when navigating to a POI, the deviation can be used to update database 102. The deviation may indicate the presence of a new road that was not previously entered into database 102. Alternatively, the deviation may indicate the existence of private roads (for example, through a shopping complex or shopping mall) that can be used to navigate to a particular destination. In that case, database 102 may be supplemented with the new roadway information that can be used in future route calculations.

Additionally, system 100 can use the vehicle probe data to modify the position of existing POIs, create new POIs within database 102, or create new information describing POIs within database 102. For example, database 102 may include a POI associated with a particular commercial establishment. After the user selects that establishment and navigates towards the establishment, the vehicle stops moving (i.e., is parked) some distance away from location of the establishment in database 102. In that case, because the vehicle stopped some distance from the establishment, that may indicate that the location of the establishment within database 102 is incorrect. As such, system 100 can use the position of the parked vehicle to update the actual location of the establishment within database 102. This functionality may be useful, for example, where the establishment is located on a large private property, and where the address for that property identifies a location some distance away from the actual location of the establishment. In that case, by updating database 102, more accurate locations for POIs can be defined within database 102.

Depending upon the implementation of system 100, vehicle probe data may be collected any time that the vehicle is moving, allowing system 100 to capture information describing numerous roadways and POIs that were not previously entered into database 102. Additionally, as described below, the probe data can be used to supplement or otherwise enhance the geographical information stored in database 102.

In one implementation, database 102 is stored locally to system 100 and processor 104 is placed in direct communication with database 102. In other implementations, though, database 102 may be at a remote location away from processor 104. For example, database 102 may be provided at a central computer system that is configured to communicate with a number of systems 100. When database 102 is centrally located, processor 104 communicates with database 102 using communication system 108. Communication system 108 may include a wireless communication system such as a cellular network, 802.11 network, or other wireless communication infrastructure.

GPS sensor 110 provides location information for the user's vehicle to processor 104. Processor 104 can use GPS sensor 110 to determine the vehicle's speed, direction of travel, acceleration, altitude, and other positional data. In some cases, processor 104 is also in communication with one or more position sensors 112 that are also configured to provide data describing the vehicle's speed, direction of travel, acceleration, altitude, and other positional data. Position sensors 112 may include gyroscopes, accelerometers, wheel pulse sensors, wheel angle sensors, and the like for providing data to assist in determining the current positional data for the vehicle. Processor 104 is configured to analyze data received from both GPS sensor 110 and position sensors 112 to determine the current positional data for the vehicle. The combination of both GPS sensor 110 and position sensor 112 data can be useful to mitigate problems associated with one of GPS sensor 110 or position sensors 112 being unavailable or malfunctioning. For example, the GPS satellite could become unavailable if the GPS signal should be blocked by high buildings or if the vehicle is positioned underground. In that case, processor 104 may rely upon one of more of position sensors 112 to determine the vehicle's current positional data without relying upon GPS sensor 112.

To allow for user interaction processor 104 is in communication with user interface 106. User interface 106 includes a display that allows processor 104 to display information, such as routes, POI data, or other information for the user. User interface 106 also allows the user to input data to system 100. For example, user interface 106 may include a touchscreen, keyboard, voice interaction system, or other control interface allowing the user to interact with system 100. The user can select a target POI, request additional information regarding a particular POI, manipulate a map view that may display a particular route to be taken by the vehicle, store favorite POIs or routes, and modify the user's preference settings. In one implementation, the user interface is provided via a remote device, such as a cell phone, tablet, desktop PC, laptop, or other computing device that is in communication with processor 104, for example, via a wireless communication network.

Referring still to FIG. 2, vehicle sensor 114 is configured to detect an operating condition of the vehicle. Based upon that condition, processor 104 can then characterize one or more attributes of the vehicle's current location. For example, vehicle sensor 114 may include a refueling sensor that is configured to detect when the vehicle is taking on more fuel. For electric vehicles, vehicle sensor 114 may be configured to detect when the vehicle is being recharged. In that case, when vehicle sensor 114 indicates that the vehicle is taking on fuel, or being recharged, processor 104 can associate the current location of the vehicle with a POI such as a gas station or EV recharging station. That location data can then be used to determine a precise location for a charging or refueling station or to correct inaccurate location information for a charging or refueling station.

Figure 3:
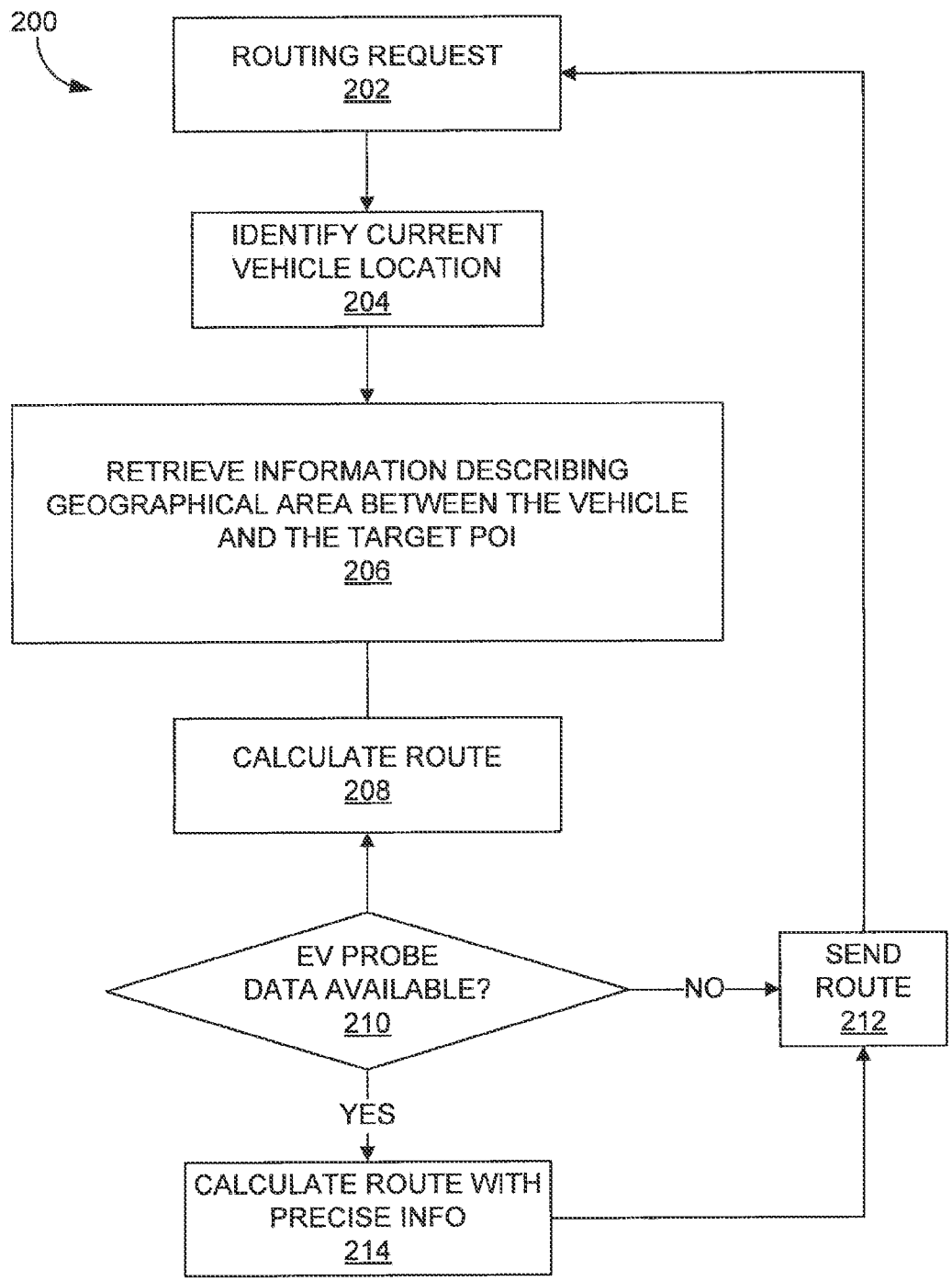
FIG. 3 is a flowchart illustrating an exemplary method for the navigation system of FIG. 2 to calculate a route to a selected POI, where the navigation system may use captured vehicle probe data to supplement the route calculation.

FIG. 3 is a flowchart illustrating an example method 200 for system 100 to calculate a route to a selected POI, where system 100 may use captured vehicle probe data to supplement the route calculation.

In step 202, system 100 receives a routing request for a particular target destination via user interface 106. The request may identify a particular POI within database 102, or an address within the geographical region covered by database 102. Using the target POI or the address, system 100 identifies a location for the target destination.

In step 204, system 100 identifies a current location of the vehicle using current probe data captured via, for example, GPS sensor 112 and/or position sensor 112. The location data may include a current latitude and longitude of the vehicle, as well as a current altitude.

After identifying the location of the target destination and the vehicle, in step 206 system 100 retrieves information describing the geographical area between the vehicle and the target POI. The information may include data describing accessible roadways between the vehicle and the target POI, as well as information describing the roadways, such as type (e.g., freeway, highway, or surface street), speed limits associated with each roadway, real time information describing a condition of the roadways (e.g., traffic conditions, weather conditions, etc.), information useful for calculating an eco-efficient route (e.g., slope), or proximity to fueling or recharging stations. In one implementation of system 100, the information retrieved in step 204 is limited to non-probe data contained within database 102. As such, the information may include data that was preloaded into system 100 by a manufacturer, or information that was distributed via a storage medium or wireless communications network to system 100.

In step 208, system 100 uses the information retrieved in step 206 to calculate a candidate route to the target destination identified in step 202. After calculating the candidate route in step 208, in step 210 system 100 determines whether historical vehicle probe data is available within database 102 that may be used to supplement the route calculated in step 206. As described above, the vehicle probe data may be used to identify private or hidden roads that may be used to determine a more efficient route to the target destination. If no such data is available, in step 212 system 100 displays the candidate route using user interface 106.

If, however, historical probe data is available describing potential roadways between the vehicle and the target destination, the probe data is used in step 214 to update the route that was previously calculated in step 208. For example, if the historical probe data indicates that roadways exist between the vehicle and the target destination that would be-provide for a more efficient route to the target destination, the route can be modified to utilize those roadways. In many cases, these roadways may include private roadways through commercial property, or new roadways that are not identified in the non-probe data. After revising the route using the historical probe data, the revised route is displayed on user interface 106 in step 212.

Figure 4A:
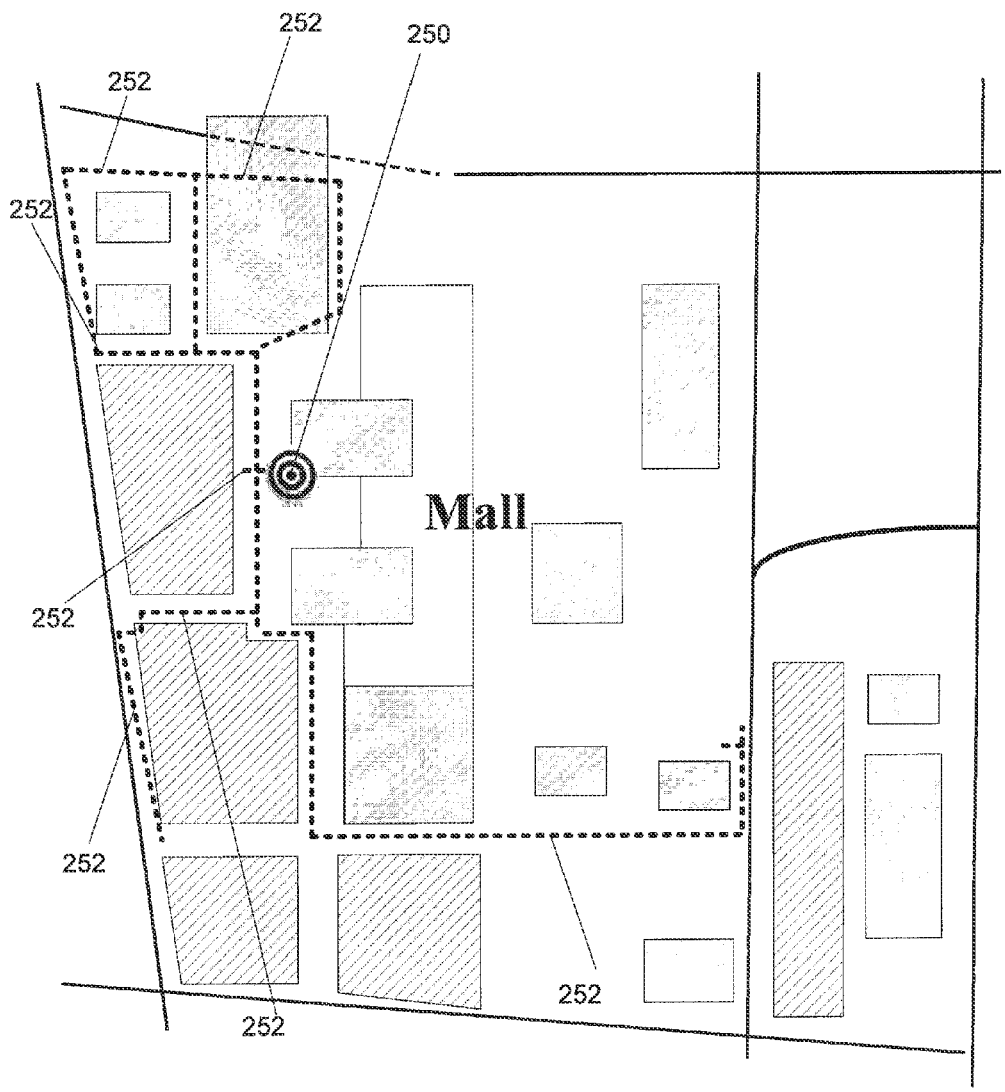
FIGS. 4A and 4B are overhead views of a shopping mall illustrating potential routes through property associated with the mall.
Figure 4B:
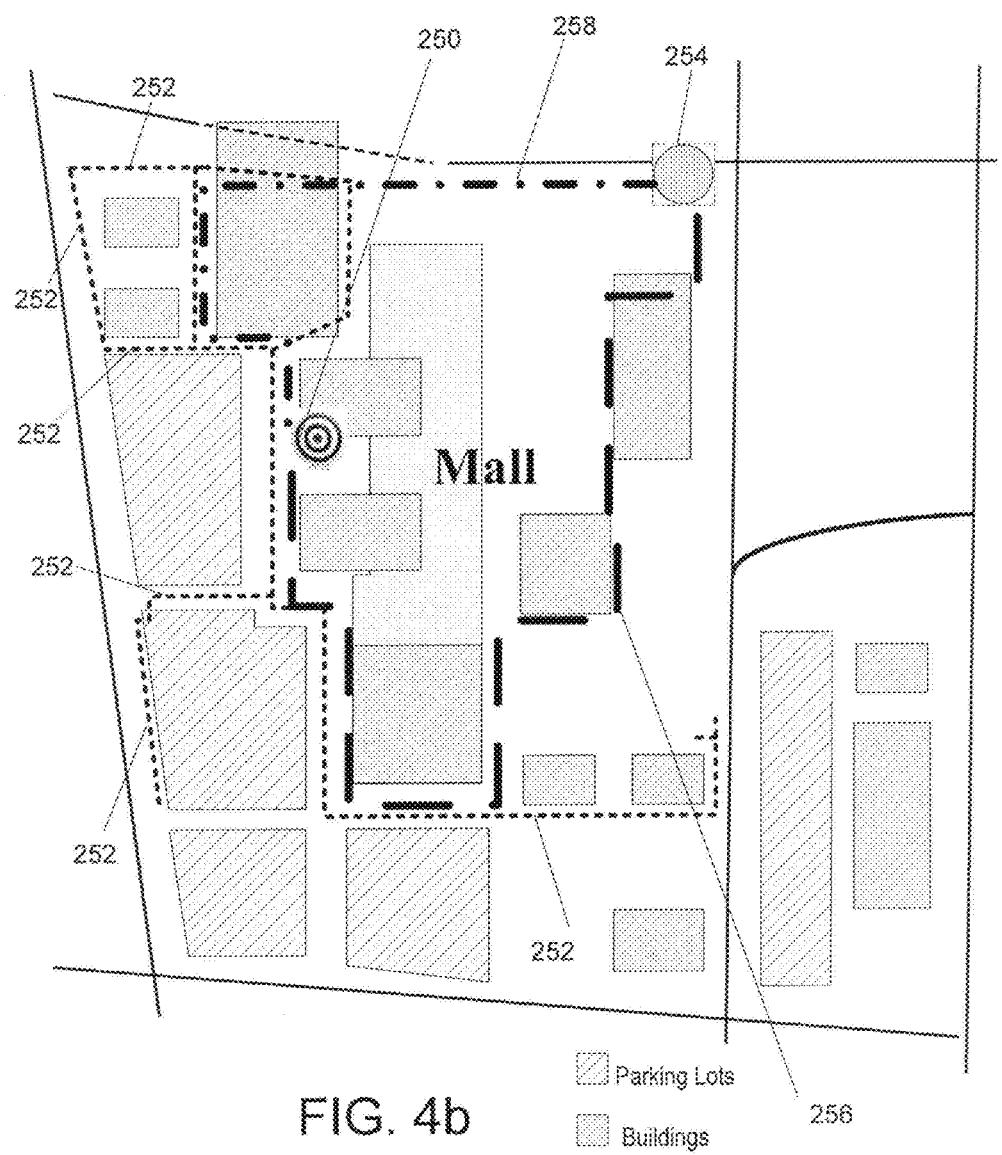

As such, navigation system 100 can use captured probe data to supplement existing geographical location data stored in database 102. For example, FIG. 4A shows an overhead view of a shopping mall. In FIG. 4A a target POI is located at the bull's eye indicated by element 250. Additionally, navigation system 100 has stored a number of historical vehicle location probe data points 252 that are positioned throughout the parking lots of the shopping mall. The probe data points 252 may have been captured at any time and, as shown in FIG. 4A, represent the position of the vehicle on the shopping mall property. As such, probe data points 252 generally represent the location of various roadways through the shopping mall. In some cases, a number of data points collected from a number of different vehicles can be combined together by navigation system 100 to ensure that the maximum number of data points have been collected, thereby providing as much information about the geographical region of interest as possible. Referring to FIG. 4B a user wishes to navigate from point 254 to target POI 250. A conventional navigation system would be unable to map this journey as the system would not have access to any information describing available roadways or paths through the shopping mall property. As such, a user would have to guess as to the most effective routes for navigating to target POI 250 (even assuming that the user knows the location of the target POI). Given the lack of information, it is likely that the user would take an inefficient route to the target POI, such as route 256.

In contrast, the present navigation system, implementing a method such as that shown in FIG. 3 can use the available vehicle location probe data points 252 to identify candidate routes through the shopping mall property. As such, navigation system 100 can calculate a route that utilizes probe data points 252 to allow the user to drive an optimal route (for example, route 258) to target POI 250. Therefore, the present navigation system 100 allows for the calculation of efficient routes using captured vehicle probe data that describes available roadways. Additionally, because the probe data can be captured using one or more of GPS sensor 110 and position sensors 112, the probe data can be captured even when GPS signals are unavailable. As such, routes through underground roadways or multistory parking structures can be captured for later use in navigation.

Figure 5:
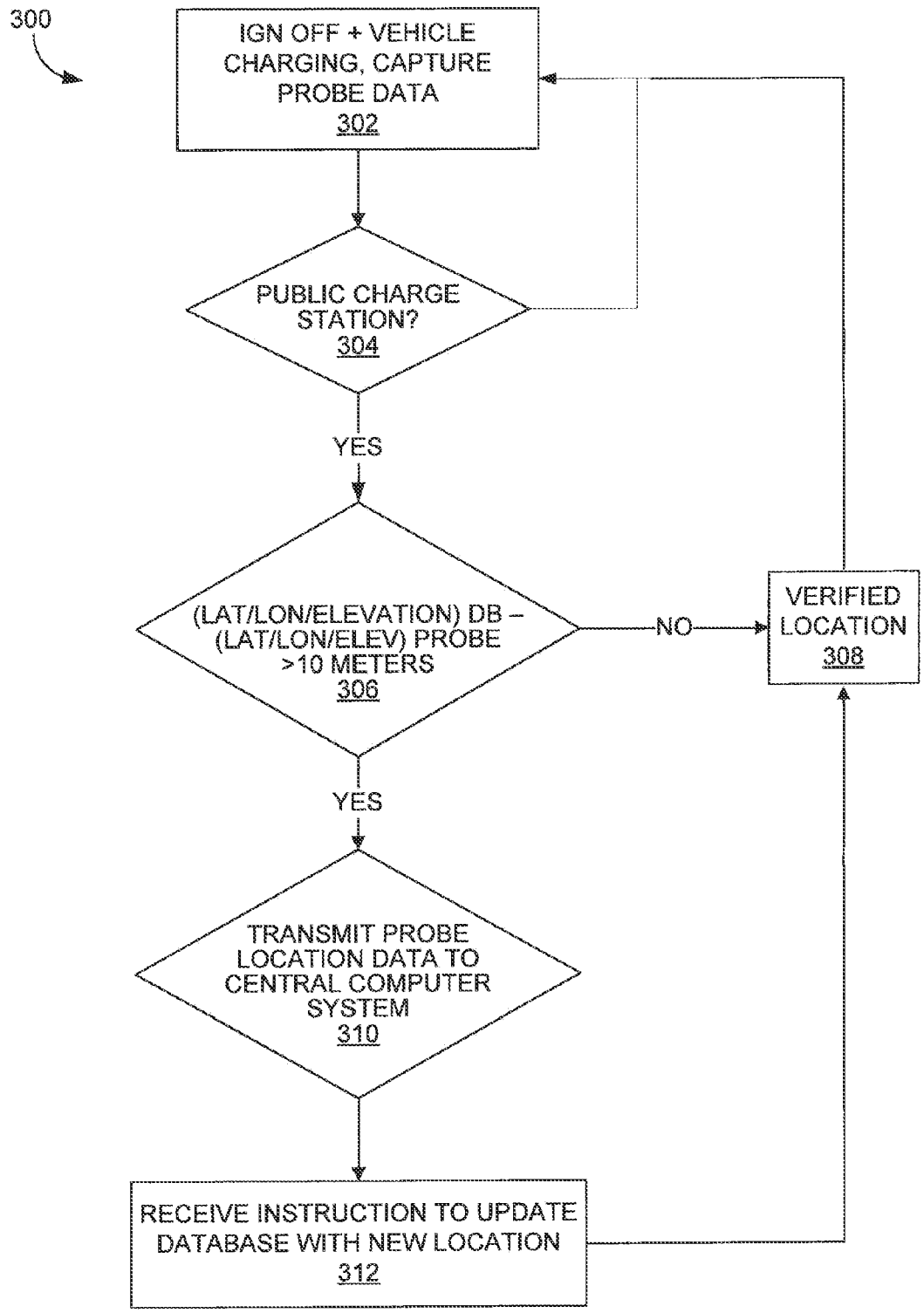
FIG. 5 is a flowchart illustrating an exemplary method for the navigation system to identify a location of a recharging station for an EV using vehicle probe data.

In addition to calculating navigation routes using vehicle location probe data, as described above, system 100 can use the vehicle probe data to update location data for POIs within database 102. For example, system 100 may use the vehicle probe data to identify the location of available recharging stations for EVs or to update and/or refine the actual position of recharging stations that are already identified within database 102. For example, FIG. 5 is a flowchart illustrating method 300 for system 100 to identify a location of a recharging station for an EV using vehicle probe data. Method 300 may be initiated by a user identifying a particular target recharging station to system 100 using user interface 106. After the user navigates to the target recharging station, method 300 may be utilized to refine an actual location of the target recharging station within database 102 if, for example, the data associated within the target recharging station in database 102 is inaccurate.

In step 302, after the user navigates to a particular target recharging station, system 100 detects that the vehicle's ignition is in an off position. Additionally, using vehicle sensor 114, system 100 determines that the vehicle is currently being recharged (indicating that the vehicle is positioned in close proximity to the target recharging station). At this time, system 100 may also use available vehicle probe data to verify that the vehicle is not moving. If, for example, the probe data indicates that the vehicle is moving while being charged an error condition may exist and the user may be notified of the error condition using user interface 106.

Upon determining that the vehicle is being charged, system 100 captures a current location of the vehicle using available probe data collected from GPS sensor 110 and/or position sensor 112. That location information can then be associated with the target recharging station that is currently charging the vehicle.

In step 304, after capturing the location information for the vehicle (and, thereby, the recharge station), system 100 determines whether the recharge station is a public or private recharging station. Private recharging stations may include those located at private residences, or that are associated with private businesses and can only be used by people who have received the appropriate permission. Conversely, public recharging facilities are those that are accessible to the public and can be used by anyone to recharge their vehicle for a fee. In cases where the user has navigated to a target recharging station selected from database 102, system 100 may use data stored within database 102 to determine whether the recharging station is public or private.

In other cases, system 100 may perform a number of tests to identify whether the target recharging station is public or private. First POIs within the vicinity of the location of the target recharging station can be analyzed. If, for example, the identified recharging station is located in the middle of a residential neighborhood, the recharging is likely occurring at an individual's residence and is not accessible to the public. Similarly, if the identified recharging station is located on private property (e.g., at a location within the perimeter of a private facility), the recharging station is likely to be private. Conversely, if the identified recharging station is located in a publicly accessible area, such as in the middle of a large shopping complex or shopping mall, at an airport, or in a public parking lot, the identified recharging station is likely to be publicly available.

In some implementations, the vehicle sensor 114 may be configured to capture data indicating whether the recharge station is publicly accessible. Private recharging systems, for example, may transmit a particular signal to vehicle sensor 114 that can be used to differentiate public and private recharging stations.

If the recharging station is determined to be private, data describing that recharging station is not captured, and method 300 restarts.

If, however, the recharging station is public, in step 306, system 100 determines whether the vehicle probe data captured in step 302 is different from the data for the recharging station that was previously stored in database 102. If the probe data captured in step 302 identifies a location that is within a threshold distance (e.g., 10 meters) of the location in database 102, the location information already contained within database 102 is considered to be verified in step 308 and method 300 resets.

If, however, the probe data captured in step 302 identifies a location more than a threshold distance away from the location identified in database 102, the captured location information is transmitted to a central computer system in step 310 using, for example, communication system 108.

Upon receipt of the new location information, the central computer system determines whether probe location information identifying the location of the recharge station has been captured from a number of different vehicles. If, for example, three vehicles have each supplied probe location data that identifies a location of the recharge station within a certain distance from one another (e.g., within 1 meter of each), and that location is more than the threshold distance from the location identified in database 102, the central computer system may determine that the location identified in database 102 is incorrect. If incorrect (and a sufficient number of vehicles have reported the correct location), the central computer system may instruct the vehicle to update its map information accordingly. As such, in step 312, if a sufficient number of vehicles have reported the correct location information, system 100 receives an instruction to update the location of the recharging station in database 102 with a new, corrected location. In one implementation, the corrected location is a middle point between each of the previously reported locations received from other vehicles. In another implementation, system 100 simply updates the location information with the probe location data captured in step 302.

In another implementation of system 100, the location information for POIs and, specifically, recharging stations, as well as candidate roadways can be updated directly by an individual using a combination or overhead imagery and software tools to modify database 102 directly. For example, if a particular recharge station is located in an outside area, satellite or overhead imagery may be utilized to determine an accurate location for that recharge station. That location can then be entered into database 102 allowing for system 100 to provide navigation routes to the recharge station. Similarly, for new or private roadways, the satellite or overhead imagery can be used to identify the location and path of those roadways for inclusion into database 102. Again, after being included in database 102, these new roadways can be utilized by system 100 in calculated routes to particular target destinations.

Although the present invention has been described with respect to preferred embodiment(s), any person skilled in the art will recognize that changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

What is claimed is:

1. A method of revising data in a vehicular navigating system configured to navigate a vehicle to a target point of interest, comprising:
   providing a geographical information database storing location information for a plurality of points of interest and a plurality of roadways;
   detecting a charging status of the vehicle;
   when the charging status of the vehicle indicates that the vehicle is connected to and charging at a charging station, recording a location of the vehicle;
   identifying at least one point of interest in the geographical information database proximate the vehicle using the location of the vehicle;
   analyzing the at least one point of interest to determine whether the charging station is publicly accessible; and
   only when the charging station is publicly accessible:
      using the location of the vehicle when the charging status of the vehicle indicates that the vehicle is charging to update the location information of the charging station within the geographical information database, and
      using historical probe data of the vehicle and the location of the vehicle to update the location information of one of the plurality of roadways within the geographical information database, the one of the plurality of roadways providing a route to the charging station.

2. The method of claim 1, wherein the historical probe data of the vehicle is received from at least one of a global positioning system, an accelerometer, and a wheel pulse sensor.

3. The method of claim 1, wherein updating the location information of the charging station comprises transmitting the location of the vehicle when the charging status of the vehicle indicates that the vehicle is charging to a central computer system.

4. The method of claim 1, including:
   receiving an identification of the target point of interest selected from the plurality of points of interest in the geographical information database using a user interface, wherein the target point of interest is the charging station;
   identifying a current location of the vehicle;
   calculating a route from the current location of the vehicle to the target point of interest using the geographical information database; and
   displaying the route using the user interface.

5. The method of claim 1, including:
   determining a distance between the location of the vehicle and a location of the charging station stored in the geographical information database; and
   only updating the location information of the charging station within the geographical information database when the distance exceeds a predetermined threshold.

6. A navigation system, comprising:
   a geographical information database configured to store location information for a plurality of points of interest and a plurality of roadways;
   a vehicle sensor configured to detect a charging status of a vehicle; and a processor in communication with the geographical information database and the vehicle sensor, the processor being configured to:
- when the charging status of the vehicle indicates that the vehicle is charging, record a location of the vehicle,
- determine a distance between the location of the vehicle and a location of a charging station within the geographical information database,
- only when the distance between the location of the vehicle and the location of the charging station exceeds a predetermined threshold, use the location of the vehicle when the charging status of the vehicle indicates that the vehicle is charging to update the location information of the charging station within the geographical information database, and
- use historical probe data of the vehicle and the location of the vehicle to update the location information of one of the plurality of roadways within the geographical information database, the one of the plurality of roadways providing a route to the charging station.

7. The navigation system of claim 6, wherein the historical probe data of the vehicle is received from at least one of a global positioning system, an accelerometer, and a wheel pulse sensor.

8. The navigation system of claim 6, wherein the processor is configured to cause a transmission of the location of the vehicle when the charging status of the vehicle indicates that the vehicle is charging to a central computer system.

9. The navigation system of claim 6, wherein the processor is configured to:
- receive an identification of a target point of interest selected from the plurality of points of interest in the geographical information database using a user interface;
- identify a current location of the vehicle;
- calculate a route from the current location of the vehicle to the target point of interest using the geographical information database; and
- display the route using the user interface.

10. The navigation system of claim 6, wherein the processor is configured to:
- determine whether the charging station is located on public property; and
- only update the location information of the charging station within the geographical information database when the charging station is located on public property.

11. A non-transitory computer program product usable with a processor having a computer readable program code embodied therein, comprising:
- computer readable program code that provides a geographical information database storing location information for a plurality of points of interest and a plurality of roadways;
- computer readable program code that detects a charging status of a vehicle;
- computer readable program code that, when the charging status of the vehicle indicates that the vehicle is charging, records a location of the vehicle;
- computer readable program code that uses the location of the vehicle when the charging status of the vehicle indicates that the vehicle is charging to update the location information of a charging station within the geographical information database; and
- computer readable program code that uses historical probe data of the vehicle and the location of the vehicle to update the location information of one of the plurality of roadways within the geographical information database, the one of the plurality of roadways providing a route to the charging station.

12. The non-transitory computer program product of claim 11, wherein the historical probe data of the vehicle is received from at least one of a global positioning system, an accelerometer, and a wheel pulse sensor.

13. The non-transitory computer program product of claim 11, wherein updating the location information of the charging station comprises transmitting the location of the vehicle when the charging status of the vehicle indicates that the vehicle is charging to a central computer system.

14. The non-transitory computer program product of claim 11, including:
- computer readable program code that receives an identification of a target point of interest selected from the plurality of points of interest in the geographical information database using a user interface;
- computer readable program code that identifies a current location of the vehicle;
- computer readable program code that calculates a route from the current location of the vehicle to the target point of interest using the geographical information database; and
- computer readable program code that displays the route using the user interface.

15. The non-transitory computer program product of claim 11, including:
- computer readable program code that determines whether the charging station is located on public property; and
- computer readable program code that only updates the location information of the charging station within the geographical information database when the charging station is located on public property.

\* \* \* \* \*